(12) United States Patent
Lee (10) Patent No.: US 7,561,672 B2
(45) Date of Patent: Jul. 14, 2009

(54) AUTOMATIC VOICE CALL CONNECTION SERVICE METHOD USING PERSONAL PHONE BOOK DATABASE CONSTRUCTED THROUGH VOICE RECOGNITION

(76) Inventor: Moon Seub Lee, 3-1306, Samsung-poo-reun APT., 155 Deungnyang-dong, Buk-gu, Pohang-si, Gyeongsangbuk-do (KR) 791-210

( * ) Notice: Subject to any disclaimer, the term of this patent is extended or adjusted under 35 U.S.C. 154(b) by 905 days.

(21) Appl. No.: 10/488,450

(22) PCT Filed: Aug. 26, 2002

(86) PCT No.: PCT/KR02/01607

§ 371 (c)(1),
(2), (4) Date: Mar. 3, 2004

(87) PCT Pub. No.: WO03/021923

PCT Pub. Date: Mar. 13, 2003

(65) Prior Publication Data

US 2004/0247088 A1     Dec. 9, 2004

(30) Foreign Application Priority Data

Sep. 4, 2001    (KR)   ........................... 2001-0054229

(51) Int. Cl.
*H04M 1/64* (2006.01)
(52) U.S. Cl. .................. 379/88.03; 379/88.02; 704/246
(58) Field of Classification Search ... 379/88.01–88.03; 704/246
See application file for complete search history.

(56) References Cited

U.S. PATENT DOCUMENTS

| 5,204,894 | A | * | 4/1993 | Darden ..................... 379/88.03 |
| 5,465,290 | A | * | 11/1995 | Hampton et al. .......... 379/88.02 |
| 6,236,715 | B1 | * | 5/2001 | Wong ....................... 379/88.03 |
| 6,327,347 | B1 | * | 12/2001 | Gutzmann ............... 379/88.02 |
| 6,370,237 | B1 | * | 4/2002 | Schier ...................... 379/88.03 |
| 6,650,738 | B1 | * | 11/2003 | Pershan et al. ........... 379/88.03 |

FOREIGN PATENT DOCUMENTS

| EP | 0451693 A2 | 10/1991 |
| JP | 05-041739 | 2/1993 |

(Continued)

OTHER PUBLICATIONS

The Annex to the European Search Report in corresponding European Application, dated Feb. 5, 2007, 1 page.

*Primary Examiner*—Simon Sing
(74) *Attorney, Agent, or Firm*—Baker & Daniels LLP (57) ABSTRACT

Disclosed is an automatic voice call connection service method using a personal phone book database constructed through voice recognition, which includes the steps of allocating personal databases corresponding to phone number to each service user; storing name text, speaker verification feature, speaker-dependent voice recognition name feature and called phone number to the personal database; extracting the speaker verification feature when the speaker requires a phone call and then sending the feature to a voice recognition server/database; verifying the speaker with the feature and searching a name text and a called phone number with the speaker-dependent voice recognition name feature; checking the searched name text and sending the text as a voice to the user; and connecting the call through a public switched telephone network (PSTN).

8 Claims, 5 Drawing Sheets

FOREIGN PATENT DOCUMENTS

| | | |
|---|---|---|
| JP | 09-233187 | 9/1997 |
| KR | 2000-18247 | 4/2000 |
| KR | 20-0217573 | 1/2001 |
| KR | 2001-97910 | 11/2001 |
| KR | 2002-20615 | 3/2002 |
| WO | 0005861 A | 2/2000 |
| WO | 0030052 A | 5/2000 |

* cited by examiner

| KEYWORD | SUB_KEYWORD 1 | SUB_KEYWORD 2 | SUB_KEYWORD 3 |
|---|---|---|---|
| CALLING PHONE NUMBER 1 | SPEAKER VERIFICATION FEATURE 1_1 (FOR EXAMPLE, SPEAKER VERIFICATION FEATURE OF 'FATHER') | SPEAKER-DEPENDENT VOICE RECOGNITION NAME FEATURE 1_1_1<br><br>NAME TEXT 1_1_1 | RECEIVING PHONE NUMBER 1_1_1<br>1_1_1. 1.HOUSE PHONE NUMBER<br>1_1_1. 2.CELLULAR PHONE NUMBER<br>1_1_1. 3.OFFICE PHONE NUMBER |
| | | SPEAKER-DEPENDENT VOICE RECOGNITION NAME FEATURE 1_1_2<br><br>NAME TEXT 1_1_2 | RECEIVING PHONE NUMBER 1_1_2<br>1_1_2. 1.HOUSE PHONE NUMBER<br>1_1_2. 2.CELLULAR PHONE NUMBER<br>1_1_2. 3.OFFICE PHONE NUMBER |
| | | SPEAKER-DEPENDENT VOICE RECOGNITION NAME FEATURE 1_1_3<br><br>NAME TEXT 1_1_3 | RECEIVING PHONE NUMBER 1_1_3<br>1_1_3. 1.HOUSE PHONE NUMBER<br>1_1_3. 2.CELLULAR PHONE NUMBER<br>1_1_3. 3.OFFICE PHONE NUMBER |
| | | . . . . . . . . . | . . . . . . . . . |
| | SPEAKER VERIFICATION FEATURE 1_2 (FOR EXAMPLE, SPEAKER VERIFICATION FEATURE OF 'MOTHER') | SPEAKER-DEPENDENT VOICE RECOGNITION NAME FEATURE 1_2_1<br><br>NAME TEXT 1_2_1 | RECEIVING PHONE NUMBER 1_2_1<br>1_2_1. 1.HOUSE PHONE NUMBER<br>1_2_1. 2.CELLULAR PHONE NUMBER<br>1_2_1. 3.OFFICE PHONE NUMBER |
| | | SPEAKER-DEPENDENT VOICE RECOGNITION NAME FEATURE 1_2_2<br><br>NAME TEXT 1_2_2 | RECEIVING PHONE NUMBER 1_2_2<br>1_2_2. 1.HOUSE PHONE NUMBER<br>1_2_2. 2.CELLULAR PHONE NUMBER<br>1_2_2. 3.OFFICE PHONE NUMBER |
| | | SPEAKER-DEPENDENT VOICE RECOGNITION NAME FEATURE 1_2_3<br><br>NAME TEXT 1_2_3 | RECEIVING PHONE NUMBER 1_2_3<br>1_2_3. 1.HOUSE PHONE NUMBER<br>1_2_3. 2.CELLULAR PHONE NUMBER<br>1_2_3. 3.OFFICE PHONE NUMBER |
| | . . .<br>(SPEAKER VERIFICATION FEATURES ARE REGISTERED AS MUCH AS THE NUMBER OF FAMILY MEMBERS) . . . | . . . . . . . . . | . . . . . . . . . |

FIG. 4b

| KEYWORD | SUB_KEYWORD 1 | SUB_KEYWORD 2 | SUB_KEYWORD 3 |
|---|---|---|---|
| CALLING PHONE NUMBER 2 | SPEAKER VERIFICATION FEATURE 2_1 (FOR EXAMPLE, SPEAKER VERIFICATION FEATURE OF 'FATHER') | SPEAKER-DEPENDENT VOICE RECOGNITION NAME FEATURE 2_1_1<br><br>NAME TEXT 2_1_1 | RECEIVING PHONE NUMBER 2_1_1<br>2_1_1. 1.HOUSE PHONE NUMBER<br>2_1_1. 2.CELLULAR PHONE NUMBER<br>2_1_1. 3.OFFICE PHONE NUMBER |
| | | SPEAKER-DEPENDENT VOICE RECOGNITION NAME FEATURE 2_1_2<br><br>NAME TEXT 2_1_2 | RECEIVING PHONE NUMBER 2_1_2<br>2_1_2. 1.HOUSE PHONE NUMBER<br>2_1_2. 2.CELLULAR PHONE NUMBER<br>2_1_2. 3.OFFICE PHONE NUMBER |
| | | SPEAKER-DEPENDENT VOICE RECOGNITION NAME FEATURE 2_1_3<br><br>NAME TEXT 2_1_3 | RECEIVING PHONE NUMBER 2_1_3<br>2_1_3. 1.HOUSE PHONE NUMBER<br>2_1_3. 2.CELLULAR PHONE NUMBER<br>2_1_3. 3.OFFICE PHONE NUMBER |
| | | . . . . . . . . . . . | . . . . . . . . . . . |
| | SPEAKER VERIFICATION FEATURE 2_2 (FOR EXAMPLE, SPEAKER VERIFICATION FEATURE OF 'MOTHER') | SPEAKER-DEPENDENT VOICE RECOGNITION NAME FEATURE 2_2_1<br><br>NAME TEXT 2_2_1 | RECEIVING PHONE NUMBER 2_2_1<br>2_2_1. 1.HOUSE PHONE NUMBER<br>2_2_1. 2.CELLULAR PHONE NUMBER<br>2_2_1. 3.OFFICE PHONE NUMBER |
| | | SPEAKER-DEPENDENT VOICE RECOGNITION NAME FEATURE 2_2_2<br><br>NAME TEXT 2_2_2 | RECEIVING PHONE NUMBER 2_2_2<br>2_2_2. 1.HOUSE PHONE NUMBER<br>2_2_2. 2.CELLULAR PHONE NUMBER<br>2_2_2. 3.OFFICE PHONE NUMBER |
| | | SPEAKER-DEPENDENT VOICE RECOGNITION NAME FEATURE 2_2_3<br><br>NAME TEXT 2_2_3 | RECEIVING PHONE NUMBER 2_2_3<br>2_2_3. 1.HOUSE PHONE NUMBER<br>2_2_3. 2.CELLULAR PHONE NUMBER<br>2_2_3. 3.OFFICE PHONE NUMBER |
| | . . . (SPEAKER VERIFICATION FEATURES ARE REGISTERED AS MUCH AS THE NUMBER OF FAMILY MEMBERS)· · · | . . . . . . . . . . . | . . . . . . . . . . . |

AUTOMATIC VOICE CALL CONNECTION SERVICE METHOD USING PERSONAL PHONE BOOK DATABASE CONSTRUCTED THROUGH VOICE RECOGNITION

TECHNICAL FIELD

The present invention relates to an automatic voice call connection service method which constructs a personal phone book database in a wired communication network by using a phone or Internet, and then automatically connects a wired telephone user to a called phone number just if the user speaks a name of the called registered in the personal phone book database. This method realizes an automatic voice call connection service using a personal phone book by using a voice recognition technology for speaker verification, a speaker-dependent voice recognition technology, an intelligent network technology supporting CCS-N07 signaling and a packet network technology supporting a real time service. The automatic voice call connection service method enables a user to make an automatic call connection through a public switched telephone network (PSTN) at any time and at any place.

BACKGROUND ART

When memorizing phone numbers, wired phone users generally use a paper notebook or a storage area of a cellular phone. But, the users may suffer inconvenience when these paper notebook and cellular phone are not carried or lost.

To solve such inconvenience, there is provided a method of mounting a voice recognition chip in the wired phone. In this method, when a user speaks a name in a voice, the wired phone searches a called phone number corresponding to the name from a database constructed in the phone and then sends MFC signals of the called phone number to a local telephone exchange so as to connect a call. This method however requires a lot of costs to construct a voice recognition module in the phone. In addition, this method is inconvenient to manage a personal database and very inefficient for a user to use.

There is also a method that, with a voice recognition chip installed in a wired phone, when a user speaks a name in a voice, a phone searches a called phone number from a PC or a database server connected to the phone and then sends MFC signals of the called phone number to a local telephone exchange so as to connect a call. This method gives easier management of a personal database. But, this method still has problems since there are required a lot of costs for construction of a voice recognition module and additional devices for connection to the information storage device. In addition, this method is not so efficient to use.

As an alternative, there is a case that a voice recognition module, a voice guidance device and a voice recognition database are built in a public switched telephone network (PSTN). In this case, when a user speaks a name in a voice through a wired telephone, an exchange searches a phone number corresponding to the name and then connects a call. This method needs to construct the voice recognition module in the exchange to use a personal phone number connection function. But, since this method does not provide a speaker identification process to users, the users should input password numbers to the exchange for user identification. In addition, when providing such service to numerous users, this method shows problems in construction costs, network capacity, real time processing ability and so on.

Thus, the above-mentioned conventional methods have serious problems in view of costs, technique and convenience.

DISCLOSURE OF INVENTION

The present invention is designed to overcome such problems of the prior art. An object of the invention is to provide an automatic voice call connection service method which construct a personal phone book with personal information files related to a calling phone number, a name text, a speaker verification feature, a speaker-dependent voice recognition name feature and a called phone number corresponding to a name by using a telephone so that a user may conveniently make a phone call to the called phone number registered in the personal phone book with a voice at any place and at any time by using a voice recognition technology through an intelligent network, a packet network and a PSTN.

In order to accomplish the above object, the present invention provides an automatic voice call connection service method using a personal phone book DB, which includes the steps of allocating a personal storage area in the personal phone book DB corresponding to a personal phone number to each service user; storing a name text, a speaker verification feature, a speaker-dependent voice recognition name feature and a called phone number, which are obtained on the basis of a spoken name and a pushed called phone number from the service user, to the personal storage area by using a calling phone number as a key; when the user inputs a called name in a voice to request a call connection to a called phone number, extracting a speaker verification feature and a speaker-dependent voice recognition name feature from the voice of the user with a voice guidance and voice feature extracting device and then sending the features to a voice recognition server together with a calling phone number obtained from a local exchange; verifying the user with the extracted speaker verification feature and searching a name text and a called phone number corresponding to the extracted speaker-dependent voice recognition name feature from the personal phone book DB by using the voice recognition server; sending the searched name text to the voice guidance and voice feature extracting device so that the voice guidance and voice feature extracting device searches each syllable of the name text from a name syllable DB to generate the name in a voice, and sending the name in a voice to the calling phone so that the user confirm the called name; the voice recognition server transmitting the sent calling phone number and the searched called phone number to a service control point (SCP) of an intelligent network after the confirmation step; and the service control point (SCP) of an intelligent network controlling call connection by using the calling phone number and the called phone number.

BRIEF DESCRIPTION OF THE DRAWINGS

These and other features, aspects, and advantages of preferred embodiments of the present invention will be more fully described in the following detailed description, taken accompanying drawings. In the drawings;

FIGS. 4a and 4b show personal information files stored in a personal phone book DB connected to a voice recognition server and their data structure, as an example.

BEST MODES FOR CARRYING OUT THE INVENTION

Figure 1:
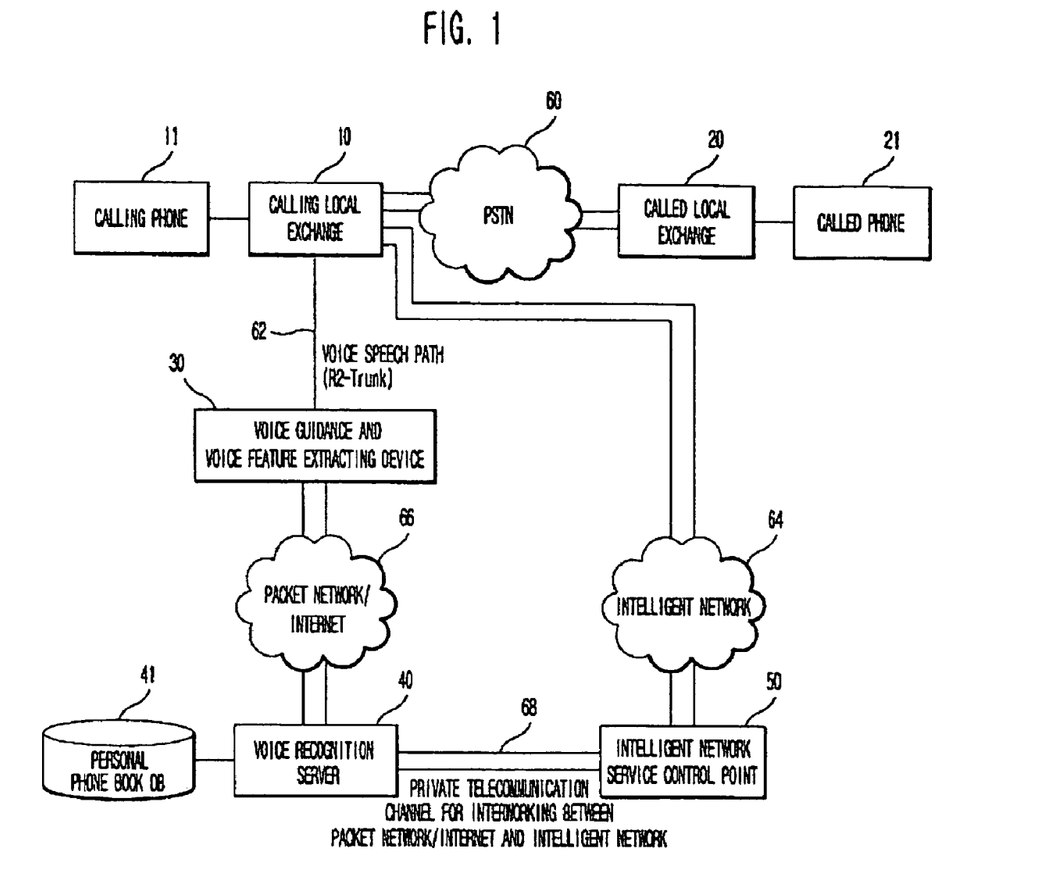
FIG. 1 is a block diagram exemplarily showing a network system to which the present invention is applied.

Hereinafter, preferred embodiments of the present invention will be described in detail with reference to the accompanying drawings. FIG. 1 is an example of interconnections among a voice guidance and voice feature extracting device, a voice recognition server, a packet network or Internet, and an intelligent network in the public switched telephone network (PSTN) to which the present invention is applied.

In this circumstance on PSTN, a personal phone book for each user is configured with information input through a telephone or Internet and stored in a personal phone number DB 41 connected to a voice recognition server 40. The user registers a called phone number in the personal phone number DB 41 and the user may use this registered called phone number in order to make a convenient automatic call to the called phone number through PSTN.

An automatic voice call connection service provided by the present invention is as follows. At first a user picks up a telephone receiver. Then, the user inputs a service identification number or waits for 5 seconds in case of a warm line or pushes an abbreviated dialing number corresponding to a service identification number and then an asterisk shortcut key. Then, the user hears a voice guidance "please, speak a called name", and then speaks a called name. The user then hears a voice guidance to confirm that the name is correct. If the name is correct, the user waits for several seconds to hear a ring-back tone as a sign for acknowledging that a call connection to the called is being attempted.

In the above process, the service identification number, which is directly input by the user or automatically input through the abbreviated dialing number or the warm line, is interpreted by a calling local exchange 10 to open a voice speech path 62 connected to a voice guidance and voice feature extracting device 30. The voice guidance and voice feature extracting device 30 requests and receives a calling phone number from the local exchange and then sends a voice guidance such as "please, speak a called name." to the user. The voice guidance starts at the starting point defined as 'Zero_Start'.

If the user speaks a called name, the voice guidance and voice feature extracting device 30 extracts a speaker verification feature and a speaker-dependent voice recognition name feature from the spoken name. The voice guidance and voice feature extracting device 30 then sends these features through a packet network or Internet network 66 to the voice recognition server 40 together with the calling phone number which is obtained from the calling local exchange 10.

The voice recognition server 40 then searches the personal phone book DB 41. At this time, the voice recognition server 40 uses the calling phone number as a key to search a specific area in the DB 41 allocated to the calling phone number. The voice recognition server 40 uses the speaker verification voice feature to verify that the user has a proper right to use the calling phone number. And then, the voice recognition server 40 finds out a name text and a called phone number having a feature corresponding to the speaker-dependent voice recognition feature from the personal phone book DB 41.

The voice recognition server 40 then sends back the searched name text to the voice guidance and voice feature extracting device 30. The voice guidance and voice feature extracting device 30 searches each syllable of the name text from a name syllable DB (not shown) and then generates the name in a voice. The user hears the generated name and confirms whether the name is correct. If the name is confirmed to be correct, the voice recognition server 40 transmits the obtained called phone number and calling phone number to a service control point 50 of an intelligent network 64 through a private telecommunication channel 68.

The intelligent network service control point 50 controls the calling local exchange 10 and the called local exchange 20 by using the received calling phone number and called phone number through the intelligent network 64, and then sends ringing tones to the calling phone 11 and the called phone 21. As soon as the called picks up a receiver of the called phone 21, the intelligent network service control point 50 makes a call connection through the PSTN 60 and manages a call start time. If the call connection is broken, the calling local exchange 10 reports a call end time to the intelligent network service control point 50 so that the intelligent network service control point 50 may generate telephone charge data.

To store personal information in the personal phone book DB 41, the present invention may use two different ways. Firstly, after making a personal data by using a voice recognition feature extracting software provided through Internet, a user may register the data to the personal phone book DB 41 of the voice recognition server 40 in a bundle on Internet through a suitable verification process. Secondly, by using a phone, a user may input a service identification number and then input a name and a called phone number related to the called name according to a guidance message.

In the second way, after inputting the service identification number, the user inputs a name 2 or 3 times according to a guidance of the voice guidance and voice feature extracting device 30 and then inputs a called phone number corresponding to the name. Then the voice guidance and the voice feature extracting device 30 extracts a speaker verification feature and a speaker-dependent voice recognition name feature. Then, operating personnel checks a name text extracted using a speaker-independent voice recognition technology, and the name text is sent to and stored in the personal phone book DB 41 of the voice recognition server 40 together with the calling phone number and the called phone number. The stored name text and called phone number are again sent to the voice guidance and voice feature extracting device 30. The voice guidance and voice feature extracting device 30 then searches each syllable of the name text from the name syllable DB (not shown) and then generates the name in a voice. The voice guidance and voice feature extracting device 30 then sends the generated name voice to the user so that the user confirms whether the name is correct. The above processes are repeated as much as the user requires to build the personal phone number DB 41.

Figure 2:
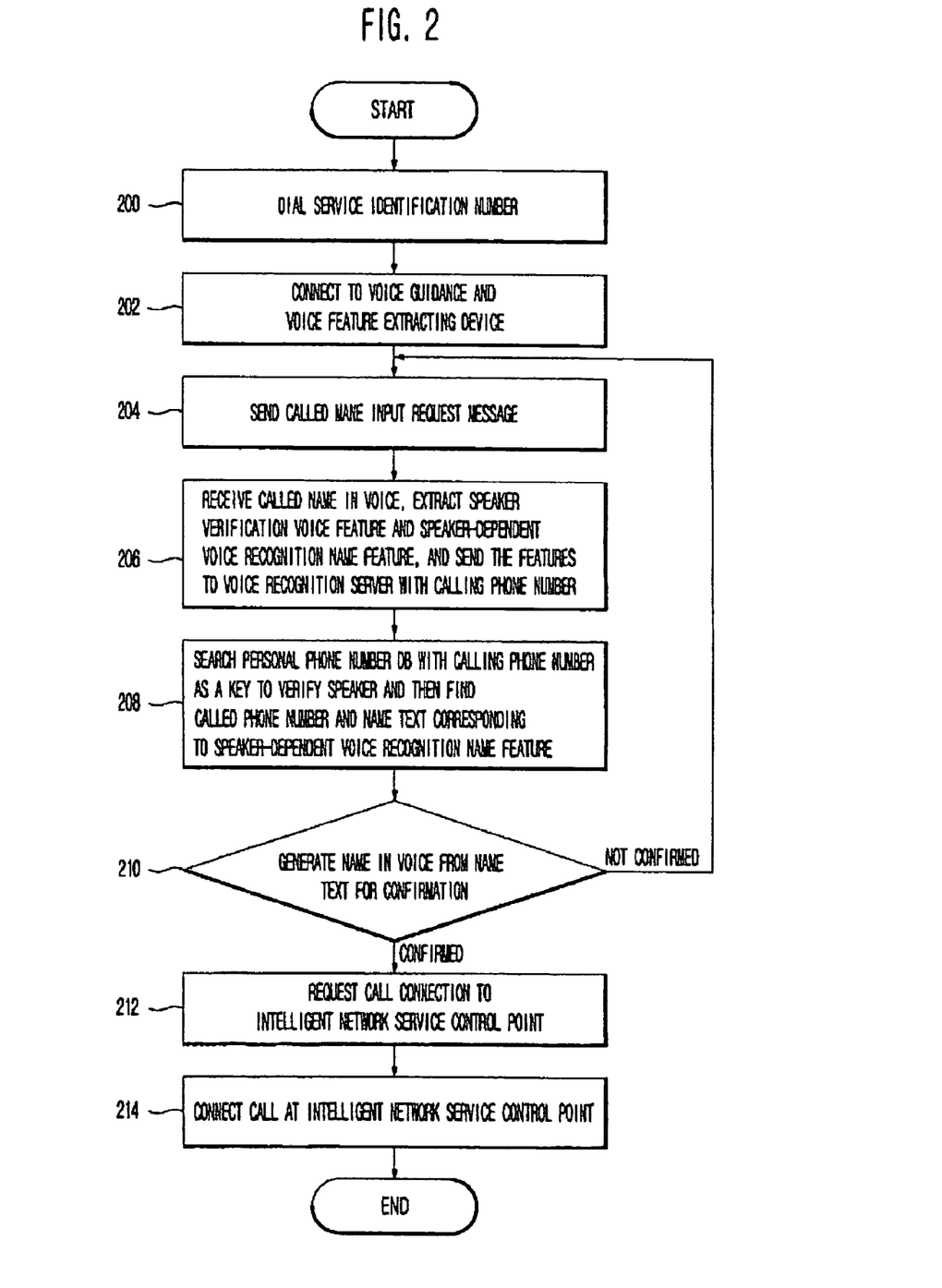
FIG. 2 is a flow chart for illustrating an example of a called phone number connecting process of the automatic voice call connection service method according to the present invention.

FIG. 2 is a flow chart showing an example of a called phone number connecting process in the automatic voice call connection service method according to the present invention.

As shown in FIG. 2, in the automatic voice call connection service of the present invention, the user waits for 5 seconds in case of a warm line or pushes an abbreviated dialing number corresponding to a service identification number or pushes the service identification number to make a call to a called phone number corresponding to a name in the user information files stored in the personal phone book DB 41 of the voice recognition server 40 (step 200). Then, the calling local exchange 10 connects the calling phone 11 to the voice guidance and voice feature extracting device 30 (step 202). The voice guidance and voice feature extracting device 30 then sends a voice guidance message advising the user to tell a called name (step 204). If the user speaks a called name in a voice, the voice guidance and voice feature extracting device 30 extracts a speaker verification feature and a speaker-dependent voice recognition name feature, and then sends the speaker verification feature and the speaker-dependent voice recognition name feature to the voice recognition server 40 connected to the personal phone book DB 41 together with a calling phone number obtained from the calling local exchange 10 (step 206). The voice recognition server 40 searches an area of the personal phone book DB 41 allocated to the user by using a received calling phone number as a key to find out a called phone number and a name text corresponding to the speaker-dependent voice recognition name feature after the speaker verification process using the speaker verification feature (step 208). The name text corresponding to the extracted called phone number is sent to the voice guidance and voice feature extracting device 30. The voice guidance and voice feature extracting device 30 then searches each syllable of the name text from the name syllable DB (not shown) and generates the name in a voice so that the user may confirm whether the name is correct (step 210). Then, the voice guidance and voice feature extracting device 30 sends the extracted called phone number and calling phone number to the intelligent network service control point 50 in order to request a call connection (step 212). Then, the intelligent network service control point 50 controls the call so that the calling phone 11 is connected to the called phone 21 (step 214).

Figure 3:
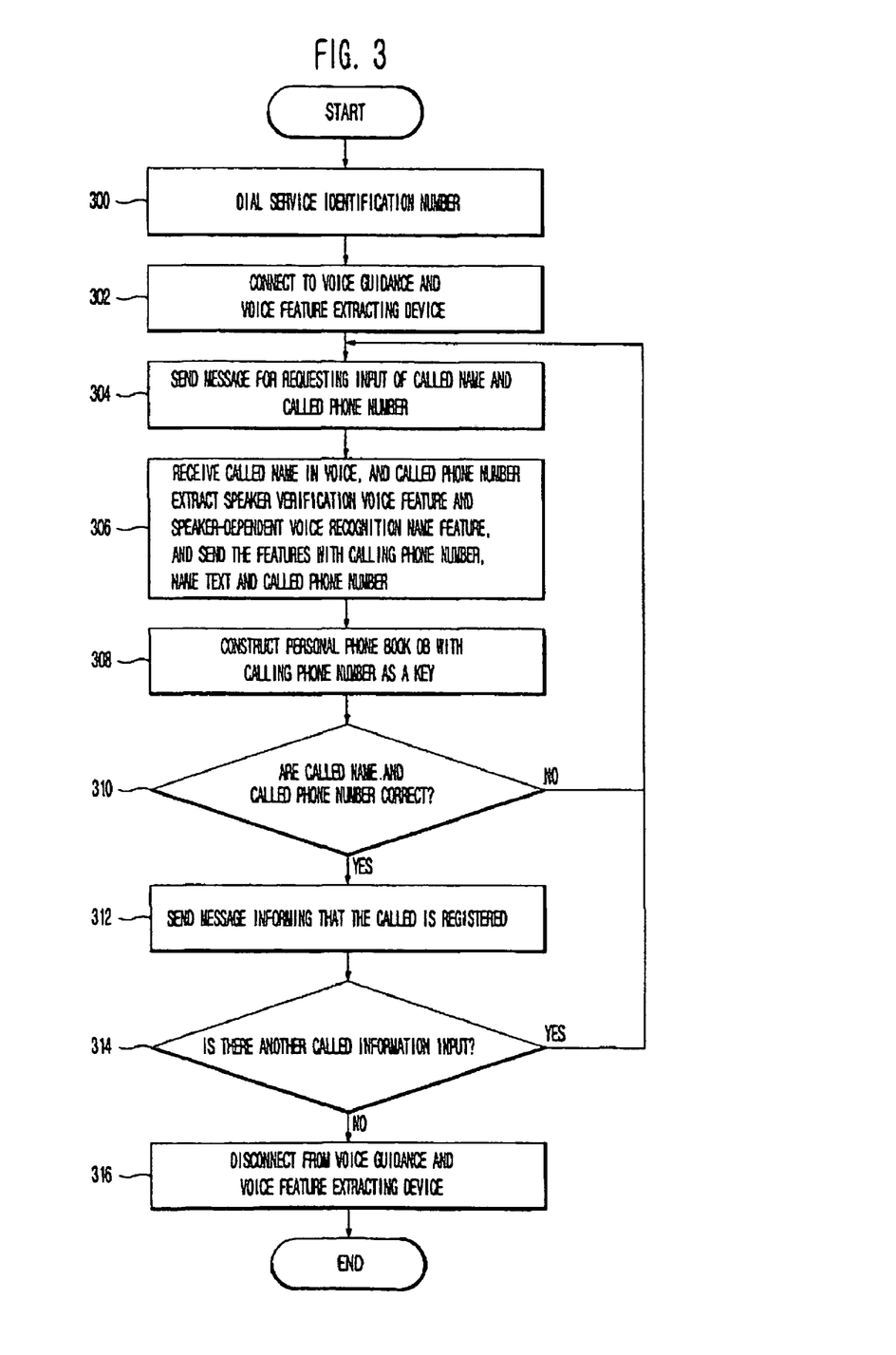
FIG. 3 is a flow chart for illustrating an example of a called phone number registration process of the automatic voice call connection service method according to the present invention.

FIG. 3 is a flow chart showing an example of a personal phone number registration process in the automatic voice call connection service method of the present invention.

As shown in FIG. 3, a user at first pushes a service identification number to build the personal phone book DB 41 allocated to the user (step 300). If the user pushes the service identification number, the calling local exchange 10 connects the calling phone 11 to the voice guidance and voice feature extracting device 30 through the voice speech path 62 (step 302). The voice guidance and voice feature extracting device 30 requests and obtains a calling phone number from the calling local exchange 10 and then sends a guidance message "Please, speak a called name." to the user so that the user speaks a called name through the calling phone 11 (step 304). Also, the voice guidance and voice feature extracting device 30 sends a guidance message "Please, input a called phone number." to the user so that the user input a called phone number (step 304). The voice guidance and voice feature extracting device 30 then extracts a speaker verification feature and a speaker-dependent voice recognition name feature from the spoken name and then sends a name text, extracted using a speaker-independent voice recognition technology and checked by operating personnel, to the voice recognition server 40 together with the calling phone number and the called phone number (step 306). The voice recognition server 40 then constructs the personal phone book DB 41 as shown in FIGS. 4a and 4b (step 308). After the personal phone book DB 41 is constructed, the stored information is checked by the user in the step 310. In the called name confirmation step (step 310), the extracted name text and the called phone number are sent back to the voice guidance and voice feature extracting device 30, and the voice guidance and voice feature extracting device 30 searches each syllable of the name text from the name syllable DB (not shown) and generates the name in a voice so that the user may confirm whether the name is correct (step 310). If the name is not confirmed, the user is requested to speak the called name again through the steps 304~310. However, if the name is confirmed to be correct, a message informing that the called is correctly registered is sent to the user (step 312) and the registration process for the called is completed. Then, if the user has more called to be registered (YES in the step 314), the registration process (from the step 304 to the step 312) is repeated as much as the user desires. If the registration process for all the called is completed and it is determined that there is no called information input (NO in the step 314), a call connection between the calling phone 11 and the voice guidance and voice feature extracting device 30 is disconnected (step 316).

In the called information registration process, the user can be provided with software having functions of the voice guidance and voice feature extracting device 30 and the voice recognition server 40 through Internet so that the user may configure and store the calling phone number, the name text, the speaker verification feature, the speaker-dependent voice recognition name feature and the called phone number in a bundle through Internet.

FIGS. 4a and 4b show an example of personal information files configuring the personal phone book DB 41 in the automatic voice call connection service method of the present invention.

As shown in FIGS. 4a and 4b, a lot of speaker verification features can be registered to one calling phone number. For example, all family members uses a phone in common, the verification features can be registered as much as the number of the family members. In addition, a plurality of name texts and speaker-dependent voice recognition name features can be registered to one speaker verification feature. For example, one member of a family may register many called as much as desired. Also, a plurality of called phone numbers can be registered to one name text and its corresponding speaker-dependent voice recognition name feature. For example, the user may register house phone number, office phone number and cellular phone number for one called name. In other words, the personal phone number DB 41 is constructed to store the calling phone number, the speaker verification feature, the name text, the speaker-dependent voice recognition name feature and the called phone number by using the calling phone number, obtained from the calling local exchange 10 as a key.

INDUSTRIAL APPLICABILITY

As described above, the method of the present invention may construct and operate the automatic voice call connection service using the personal phone book database with more excellent real time service processing ability and economical efficiency than the prior art by associating various technologies and networks which enables a user to conveniently and quickly use the voice call service in a wired telecommunication.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. An automatic voice call connection service method using a personal phone book in a phone book DB in which each calling phone number has several users and each user has his/her own phone book, the method comprising the steps of:

(a) a voice recognition server allocating a plurality of personal phone book storage areas corresponding to the number of users in one calling phone number;

(b) the voice recognition server storing a name text, a speaker verification feature used to select the corresponding phone book among several phone books in one calling phone number, a speaker-dependent voice recognition name feature used to search a called name in the selected phone book and a called phone number, which are obtained on the basis of a spoken name and a pushed called phone number from the user, to each user's phone book storage area by using a calling phone number as a first key and the speaker verification feature as a second key;

(c) when the user inputs a called name in a voice to request a call connection to a called phone number, a voice guidance and voice feature extracting device extracting two features of a speaker verification feature used to select corresponding phone book among several phone books in one calling phone number and a speaker-dependent voice recognition name feature used to search the called name in the selected phone book from the voice of the user at the same time and then sending the features to the voice recognition server together with a calling phone number obtained from a local exchange;

(d) the voice recognition server identifying the user and selecting the user's phone book with the extracted speaker verification feature among the several users' speaker verification features in the corresponding calling phone number and searching a name text and a called phone number corresponding to the extracted speaker-dependent voice recognition name feature from the selected user's phone book in the phone book DB;

(e) the voice recognition server sending the searched name text to the voice guidance and voice feature extracting device so that the voice guidance and voice feature extracting device searches each syllable of the name text from a name syllable DB to generate the name in a voice, and sending the name in a voice to the user so that the user confirm the called name;

(f) the voice recognition server transmitting the sent calling phone number and the searched called phone number to an intelligent network service control point after the conformation step (e); and (g) the intelligent network service control point connecting a call by using the calling phone number and the called phone number.

2. The automatic voice call connection service method according to claim 1, wherein, to construct the personal phone book in the phone book DB in which each calling number has several users and each user has his/her own phone book, the step (b) includes the steps of:

(h) the voice guidance and voice feature extracting device requesting and obtaining the calling phone number from the calling local exchange;

(i) the voice guidance and voice feature extracting device extracting two features of the speaker verification feature used to select the corresponding phone book among several phone books in one calling phone number and the speaker-dependent voice recognition name feature used to search a called name in the selected phone book from the name spoken by the user at the same time;

(j1) the voice guidance and voice feature extracting device obtaining the name text by extracting a text of the spoken name with a speaker-independent voice recognition technology and checking the text by operating personnel;

(k) the voice guidance and voice feature extracting device transmitting the calling phone number, the speaker verification feature, the speaker-dependent voice recognition name feature, the name text and the called phone number, obtained in the above steps, to the voice recognition server through a packet network or Internet;

(l) the voice recognition server transmitting the name text and the called phone number to the voice guidance and voice feature extracting device so that the voice guidance and voice feature extracting device sends the name to the user for confirmation; and (m) the voice recognition server storing the calling phone number, the name text, the speaker verification feature, the speaker-dependent voice recognition name feature and the called phone number in the personal storage area of the personal phone book DB by using the calling phone number as a first key and the speaker verification feature as a second key.

3. The automatic voice call connection service method according to claim 1, wherein, to construct the personal phone book in the phone book DB, the step (b) includes the steps of:

(h) the voice guidance and voice feature extracting device requesting and obtaining the calling phone number from the calling local exchange;

(i) the voice guidance and voice feature extracting device extracting two features of the speaker verification feature used to select corresponding phone book among several phone books in one calling phone number and the speaker-dependent voice recognition name feature used to search the called name in the selected phone book from the name spoken by the user at the same time;

(j2) the user accessing a server provided with a voice recognition feature extracting software and then constructing the personal phone number book in the phone book DB in a bundle;

(k) the voice guidance and voice feature extracting device transmitting the calling phone number, the speaker verification feature, the speaker-dependent voice recognition name feature, the name text and the called phone number, obtained in the above steps, to the voice recognition server through a packet network or Internet;

(l) the voice recognition server transmitting the name text and the called phone number to the voice guidance and voice feature extracting device so that the voice guidance and voice feature extracting device sends the name to the user for confirmation; and (m) the voice recognition server storing the calling phone number, the name text, the speaker verification feature, the speaker-dependent voice recognition name feature and the called phone number in the personal storage area of the personal phone book in the phone book DB by using the calling phone number as a first key and the speaker verification feature as a second key.

4. The automatic voice call connection service method according to claim 1, wherein, in the step (c), the service identification number is input by using any of the following types:

a warm line type in which the local exchange directly connects a calling phone to the voice guidance and voice feature extracting device when a user picks up a receiver of the calling phone and waits for about 5 seconds;

an abbreviated dialing type in which, when a user pushes an abbreviated dialing number, the local exchange interprets the abbreviated dialing number to connect the calling phone to the voice guidance and voice feature extracting device; and a service identification number pushing type in which a user directly pushes the service identification number with a calling phone.

5. The automatic voice call connection service method according to claim 1, wherein, to make a call connection with a voice, the step (c) includes the steps of:
(n) the voice guidance and voice feature extracting device requesting and obtaining the calling phone number from the calling local exchange;
(o) the voice guidance and voice feature extracting device extracting two features of the speaker verification feature used to select the corresponding phone book among several phone books in one calling phone number and the speaker-dependent voice recognition name feature used to search the called name in the selected phone book from the name spoken by the user at the same time; and
(p) the voice guidance and voice feature extracting device transmitting the calling phone number, the speaker verification feature and the speaker-dependent voice recognition name feature, obtained in the above steps, to the voice recognition server through the packet network or Internet.

6. The automatic voice call connection service method according to claim 1, wherein, to treat the searched information by using the received calling phone number as a key in the steps (d) and (e), the steps (d) and (e) includes the steps of:
(q) the voice recognition server identifying the user and selecting the user's phone book by comparing the speaker verification feature extracted in the step (c) with the speaker verification features stored in the personal phone books in the received calling phone number of the phone book DB in which each calling phone number has several users' phone books and each user has his/her own phone book including his/her speaker verification feature;
(r) the voice recognition server transmitting the name text searched in the step (d) to the voice guidance and voice feature extracting device so as to determine whether the name is correct; and
(s) the voice recognition server searching the called phone number by comparing the speaker-dependent voice recognition name feature extracted in the step (c) with the speaker-dependent voice recognition name features stored in the selected user's personal phone book of the phone book DB in which each calling number has several users and each user has his/her own phone book.

7. The automatic voice call connection service method according to claim 1, wherein the step (f) includes the step of:
(t) the voice recognition server converting the calling phone number and the called phone number, obtained in the steps (c) and (d), into an intelligent network service requesting message and sending the message to the intelligent network service control point through the packet network.

8. The automatic voice call connection service method according to claim 1, wherein the step (g) includes the step of:
(u) the intelligent network service control point controlling the calling local exchange by using the calling phone number received in a converted form of a service request message and controlling the called local exchange by using the called phone number.

* * * * *

UNITED STATES PATENT AND TRADEMARK OFFICE
CERTIFICATE OF CORRECTION

PATENT NO.         : 7,561,672 B2
APPLICATION NO. : 10/488450
DATED                 : July 14, 2009
INVENTOR(S)       : Moon Seub Lee Page 1 of 1

It is certified that error appears in the above-identified patent and that said Letters Patent is hereby corrected as shown below:

Column 8

Claim 3 (j2)

Line 35     Please delete the word "number" between the words "phone" and "book"

Signed and Sealed this

Twenty-fifth Day of August, 2009

David J. Kappos
*Director of the United States Patent and Trademark Office*